Sept. 18, 1934.   J. C. CROWLEY   1,973,798
DISPENSING DEVICE
Filed March 30, 1932
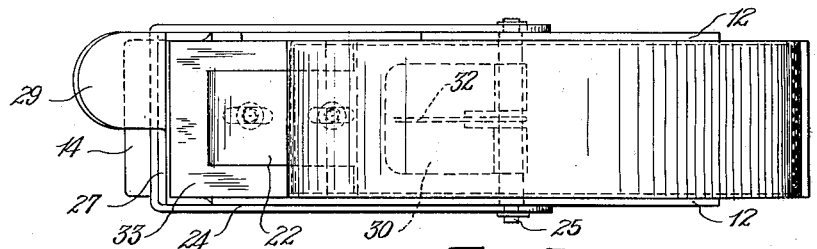
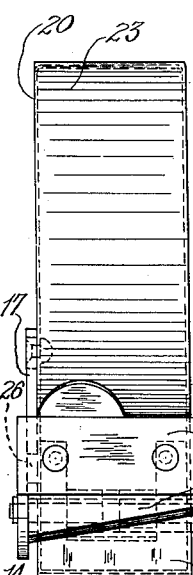
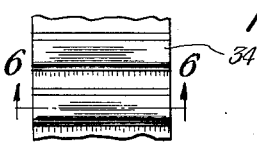
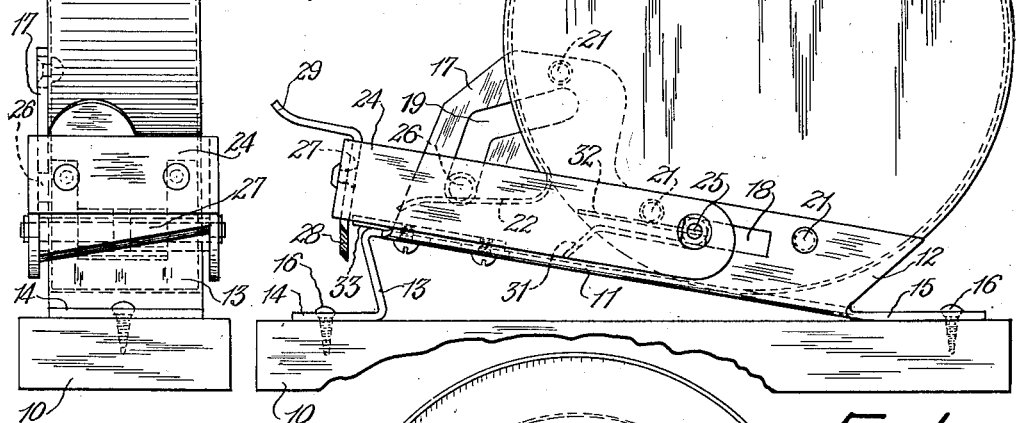
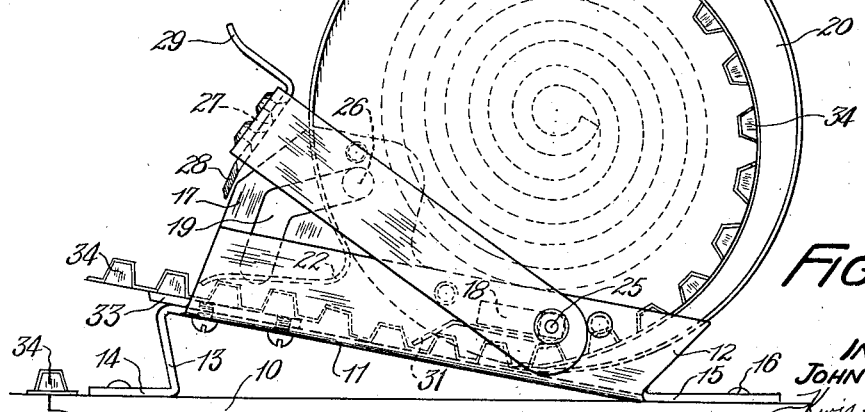
INVENTOR:
JOHN C. CROWLEY
ATTORNEYS.

Patented Sept. 18, 1934

1,973,798

UNITED STATES PATENT OFFICE 1,973,798

DISPENSING DEVICE

John C. Crowley, Cleveland Heights, Ohio, assignor to The Dill Manufacturing Company, Cleveland, Ohio, a corporation of Ohio Application March 30, 1932, Serial No. 602,025

10 Claims. (Cl. 242—55.5)

This invention relates to a dispensing device and particularly to a device for dispensing articles that may be arranged upon a strip or ribbon. Although a device embodying the invention may be advantageously used to dispense various kinds of articles, it has special utility in connection with the dispensing of valve insides, such as are used in the valve stems of pneumatic tires and other inflatable articles, and for that reason will be described in detail herein as applied to such use.

A dispensing device constructed in accordance with the present invention can be used to advantage in such places as tire repair shops, service stations, or the like, where a large number of valve insides must be kept always on hand in a convenient position to be used when desired. It has been the general custom in such places to have a supply of the valve insides loosely arranged in a box or other container, with the result that the insides are damaged through contact with each other and also from exposure to dirt and atmospheric conditions. In addition, considerable time is lost by the workman in selecting the desired number of insides from the intermixed supply.

An object of the invention is to provide a device for dispensing articles which is simple in construction, efficient in operation, and which may be inexpensively manufactured.

Another object is to provide a device for dispensing articles arranged in a continuous series, such as articles carried by a ribbon or strip, which will eject from the device a predetermined length of the strip or ribbon and will then sever the ejected portion from the remaining portion of the strip or ribbon.

Additional and further objects and advantages will become apparent hereinafter during the following detailed description of an embodiment of the invention.

Referring to the accompanying drawing illustrating said embodiment of the invention, Fig. 1 is a side elevational view of a dispensing device constructed in accordance with the invention and showing the operative parts of the device in one extreme position of their operative movement;

Fig. 2 is an end elevational view of the device shown in Fig. 1 and is taken from the lefthand side of Fig. 1;

Fig. 3 is a top plan view of the device shown in Fig. 1;

Fig. 4 is a side elevational view of the device similar to Fig. 1 but showing the cover of the magazine removed and the strip or ribbon upon which the articles are carried arranged within the device, while the operative parts of the device are at the opposite extreme position of their operative movement from that disclosed in Fig. 1;

Fig. 5 is a fragmentary detail plan view of the ribbon or strip upon which the articles are carried; and Fig. 6 is a sectional view taken substantially on line 6—6 of Fig. 5, looking in the direction of the arrows.

The device is mounted upon any suitable base, indicated in the drawing at 10, and comprises a member 11 having side flanges 12 for a portion of its length and provided at one end beyond the flanges 12 with a downwardly extending portion 13 having a foot portion 14 at its outer end, while the opposite end of said member is provided with a second foot portion 15. The downwardly extending portion 13 and the foot portion 15 are so proportioned and shaped that the member 11 when secured to the base 10 by means of suitable securing screws or other means 16 passing through the foot portions 14 and 15, respectively, will slope toward the base from the portion 13 rearwardly toward the foot portion 15, as clearly indicated in Figs. 1 and 4.

The flange 12 of the member 11 on one side thereof, namely, the rear side as viewed in the drawing, is provided at the forward end of the member (the left-hand end as viewed in the drawing) with an upwardly extending portion 17. The flanges 12 adjacent their rear or righthand ends are provided with aligned, elongated, straight slots 18 extending parallel to the bottom of the member 11, while the rear flange 12 and its portion 17 have formed therein an elbow or cam slot 19, one arm of which inclines slightly forwardly of the device and extends downwardly toward the base 10 and the other arm of which extends upwardly from the upper end of the first arm and rearwardly of the device.

A substantially circular drum or casing 20, which may be formed of sheet metal or other suitable material and which is opened at one side, is arranged between the flanges 12 adjacent the rear of the member 11 and is secured to the rear flange 12 and to the portion 17 thereof by means of rivets or other suitable means 21 passing through the rear or bottom wall of the drum or casing and through said flange 12 and the portion 17. The drum or casing 20 is arranged so that the bottom of the member 11 is substantially tangent thereto and has its side wall slit from such point of tangency or contact toward the front or left-hand end of the device, as viewed in the drawing, the slit portion of the side wall of the drum or casing 20 being bent forwardly, as indicated at 22, to provide a guiding detent and to form an opening in the drum or casing 20 adjacent the bottom of the member 11. The rear or bottom wall of the drum or casing 20 is provided with a slot registering with the slot 18 in the rear flange 12 of the member 11. A cover, indicated at 23 in Fig. 1, may be used and telescopes over the drum or casing 20 from the front side thereof and has its lower portion cut away so as to enable the cover to pass the front flange 12 in applying and removing the cover from the drum or casing.

A substantially U-shaped member 24 is arranged in straddling relation with the flanges 12 and has its legs pivotally mounted adjacent their free ends upon a pin 25 extending transversely of the member 11 and slidably supported in the slots 18 in the flanges 12 and the drum or casing 20. The rear leg (as viewed in the drawing) of the U-shaped member 24 is provided with an inwardly projecting lug or pin 26 engaging in the cam slot 19 in the portion 17 of the rear flange 12. Secured to the inner side of the base of the U-shaped member 24 and extending below the same is a knife blade 27 having an inclined cutting edge 28 at its lower end and provided at a portion of its upper end with an outwardly turned handle 29 overlying the base of the U-shaped member 24.

A plate 30 located between the flanges 12 and within the drum 20 is pivotally mounted at its forked right-hand end upon the pin 25, while its opposite end is provided with a downturned detent portion 31 extending through the opening of the side wall of the drum or casing 20 that is formed by the outwardly bent slotted portion 22 thereof. The plate 30 is limited in its upward movement by means of a spring 32 carried by the pin 25 and arranged between the tines of the forked end of the plate 30. A knife blade 33 is adjustably secured to the upper side of the member 11 by means of screws passing through elongated slots in the member 11 and in a position to cooperate with the knife blade 27 that is carried by the U-shaped member 24 as will later be explained.

Although various forms of article carrying strips or ribbons may be used in the device, a particular form has been shown therein by way of illustration and will now be described in order to more fully explain the operation of the device. The strip shown herein comprises a flat ribbon 34 formed of flexible paper or other suitable flexible material and upon which is arranged a strip or ribbon of similar material having parallel, transversely extending corrugations therein, such latter strip being secured to the first named strip at the points of contact between the troughs of the corrugations with the first named strip. It will be seen that the waves of the corrugations of the corrugated strip, together with the flat strip, when the corrugated strip is secured to the flat strip, constitute chambers extending transversely of the strip or ribbon and that articles such as valve insides may be arranged in each of said chambers, after which the ends of said chambers may be sealed or closed by suitable sealing material or by crimping the material of the strips.

The strip or ribbon with the valve insides arranged in the chamber thereof is coiled within the drum or casing 20 so that one end of the strip or ribbon extends beneath the plate 30 with the corrugated side thereof adjacent said plate, while the detent portion 31 lies between two adjacent chambers or compartments of the strip or ribbon. When the parts of the device are in the position shown in Fig. 4, that is the U-shaped member 24 is in its uppermost position and the pin 25 is at the rear end of the straight slots 18 and the projection 26 is at the upper rear end of the cam slot 19, it will be seen that downward movement of the handle 29 causes the member 24 to move downwardly and forwardly since the engagement of the projection 26 in the inclined portion of the cam slot 19 effects a bodily shifting of the member 24 and moves the pin 25 forwardly or to the left, as viewed in the drawing, in the straight slots 18. The downward movement of the member 24 continuing, it will be noted that said member shifts forwardly or to the left until the pin 25 is in engagement with the forward or left-hand end of the slots 18. Such forward movement of the pin 25 causes also a shifting of the plate 30, with the result that the ribbon or strip is moved forward a similar distance because of the location of the detent portion 31 of the plate between two adjacent chambers on the ribbon, that is, between two adjacent waves and within a trough of the corrugated strip. In the present instance, the shifting movement is so designed that the ribbon will be moved outwardly along the member 11 a distance equal to the distance between adjacent troughs of the corrugations on the strip. When the strip has been moved such a distance, the continued downward movement of the member 24 brings the cutting edge 28 of the knife blade 27 into engagement with the strip between adjacent chambers thereof and cooperates with the edge of the knife blade 33 to sever a length of the strip equivalent to one chamber from the remainder of the strip. The reversing movement of the handle 29 and member 24 returns the parts to the position shown in Fig. 4 wherein the pin 25 is at the rear or right-hand end of the slots 18, as viewed in the drawing, it being noted that during the rearward movement of the pin the plate 30 travels over the corrugated ribbon or strip with the detent portion 31 riding over the corrugations in the manner of a pawl over a ratchet, and that the detent portion 31 again comes to rest in position between two adjacent chambers of the ribbon for the next operation of the device, the part 22 of the casing 20 preventing the ribbon or strip from being pulled back into the casing when the member 24 is returned to its upward position and the spring 32 preventing the plate 30 from being swung to an inoperative position with respect to the strip or ribbon.

When a device is used for the dispensing of valve insides, it will be seen that it may very effectively be employed in repair shops, service stations, and other places, and that when a workman desires a valve insides, it is merely necessary for him to depress the handle 29 to eject the ribbon the distance of one article containing chamber and then sever such chamber from the remainder of the ribbon. Also, since the insides are carried by the ribbon or strip, they will be protected from engagement with each other and from dirt and the effects of atmosphere, with the result that the insides will be in the proper condition for efficient operation when inserted in the valve stem of a pneumatic tire or other inflated article.

Although a preferred form of the invention has been illustrated and described herein, it should be understood that the invention is susceptible of various adaptations and modifications within the scope of the appended claims.

Having thus described my invention, I claim:

1. In a device of the character described, a casing adapted to have an elongated strip arranged therein with one of its ends projecting therefrom, a detent, means maintaining said detent in engagement with said strip, means for shifting said detent a predetermined distance to move the projecting end of said strip outwardly of the casing, and cutting means associated with said shifting means and effective upon the completion of the detent shifting movement for severing a length of the strip from the projecting end of the strip.

2. In a device of the character described, a casing adapted to have an elongated strip arranged therein with one of its ends projecting therefrom, a detent, means maintaining said detent in engagement with said strip, shiftable means supporting said detent, means connected to said last named means for shifting the same and said detent to move the projecting end of said strip a predetermined distance outwardly of the casing, and means associated with said third named means for severing a length of the strip from the projecting end of the strip upon completion of its outward movement.

3. In a device of the character described, a casing adapted to have an elongated strip arranged therein with one of its ends projecting therefrom, a detent adapted to engage said strip, shiftable means supporting said detent, a member pivoted to said means, cam means associated with said member for bodily shifting the same upon swinging movement thereof whereby said detent will be shifted to move the projecting end of said strip a predetermined distance outwardly of said casing during swinging of said member in one direction, and means associated with said member for severing a length of the strip from the projecting end thereof upon completion of its outward movement.

4. In a device of the character described, a casing adapted to have an elongated strip arranged therein with one of its ends projecting therefrom, a support for said casing provided with a straight slot and with a cam slot, a pin movably arranged in said straight slot, a detent carried by said pin and adapted to engage said strip, and a member pivotally connected to said pin and having means cooperating with said cam slot whereby swinging movement of said member linearly shifts said detent, pin and member, said member and said support having cooperating cutting means effective upon said strip at one end of the swinging movement of said member.

5. In a device of the character described, a casing adapted to have an elongated strip arranged therein with one of its ends projecting therefrom, a support for said casing provided with aligned straight slots and with a cam slot, a pin supported in said straight slots for movement longitudinally thereof, a detent pivoted on said pin and adapted to engage said strip, and a U-shaped member having its legs pivoted upon said pin and provided with means engaging in said cam slot, said support and the base of the U-shaped member being provided with cooperating cutting means.

6. In a device of the character described, a casing adapted to have an elongated strip arranged therein with one of its ends projecting therefrom, a support for said casing provided for a portion of its length with upstanding flanges along its longitudinal edges and having therein aligned straight slots, one of said flanges being provided also with a cam slot, a pin supported in said straight slots for movement longitudinally thereof, a detent pivoted on said pin and adapted to engage said strip, and a U-shaped member straddling said flanges and having its legs pivoted upon said pin and being provided with means cooperating with said cam slot, said support and the base of said member being provided with cooperating cutting means.

7. In a device of the character described, a casing adapted to have an elongated strip arranged therein with one of its ends projecting therefrom, a detent adapted to engage said strip, shiftable means supporting said detent, means connected to said last named means for shifting the same to move said detent, the movement of said detent in one direction moving the projecting end of said strip a predetermined distance outwardly of the casing, means for preventing said strip being drawn back into said casing during the movement of said detent in the opposite direction, and means associated with said second named means for severing a length of the strip from the projecting end thereof upon completion of its outward movement.

8. In a device of the character described, a casing adapted to have an elongated strip arranged therein with one of its ends projecting therefrom, a detent, shiftable means supporting said detent, means carried by said shiftable means for maintaining said detent in operative position with respect to said strip, a member pivoted to said shiftable means, cam means associated with said member for bodily shifting said member upon swinging movement thereof whereby said detent will be shifted to move the projecting end of said strip a predetermined distance outwardly of said casing during swinging of said member in one direction, and means associated with said member for severing a length of the strip from the projecting end thereof upon completion of its outward movement.

9. In a device of the character described, a casing adapted to have an elongated strip arranged therein with one of its ends projecting therefrom, a detent adapted to engage said strip, shiftable means supporting said detent, an actuating member for said shiftable means, cam means associated with said actuating member for producing shifting movement of said shiftable means upon movement of said actuating member whereby said detent will be shifted to move the projecting end of said strip a predetermined distance outwardly of said casing during said movement of said actuating member, and means operatively associated with said actuating member for severing a length of the strip from the projecting end thereof upon completion of its outward movement.

10. In a device of the character described, a casing adapted to have an elongated strip arranged therein with one of its ends projecting therefrom, a support for said casing provided with a straight slot and with a cam slot, a pin movably arranged in said straight slot, a detent pivotally mounted on said pin, means carried by said pin and maintaining said detent in operative position with respect to said strip, and a member pivotally connected to said pin and having means cooperating with said cam slot whereby swinging movement of said member linearly shifts said detent, pin and member, said member and said support having cooperating cutting means effective upon said strip at one end of the swinging movement of said member.

JOHN C. CROWLEY.